June 19, 1934.  A. B. RYPINSKI  1,963,250
ELECTRIC CIRCUIT INSTALLATION
Filed Oct. 22, 1930    7 Sheets-Sheet 1

INVENTOR
ALBERT B. RYPINSKI.
BY
ATTORNEYS

June 19, 1934.　　A. B. RYPINSKI　　1,963,250
ELECTRIC CIRCUIT INSTALLATION
Filed Oct. 22, 1930　　7 Sheets-Sheet 2

INVENTOR
ALBERT B. RYPINSKI.
BY
ATTORNEYS

June 19, 1934.  A. B. RYPINSKI  1,963,250
ELECTRIC CIRCUIT INSTALLATION
Filed Oct. 22, 1930   7 Sheets-Sheet 4

INVENTOR
ALBERT B. RYPINSKI.
BY
ATTORNEYS

Patented June 19, 1934

1,963,250

UNITED STATES PATENT OFFICE 1,963,250

ELECTRIC CIRCUIT INSTALLATION

Albert B. Rypinski, Laurelton, Long Island, N. Y., assignor to Metropolitan Device Corporation, Brooklyn, N. Y., a corporation of New York Application October 22, 1930, Serial No. 490,383

13 Claims. (Cl. 247—2)

My invention aims to provide a casing structure for the circuit wires and means for assembling meters in proper relation with testing connections, cutouts, switches, fuses or other electrical devices within the casing.

The accompanying drawings illustrate an embodiment of the invention.

Fig. 7a is a diagram of the wiring corresponding to Figs. 1 to 7;

Fig. 9a is a diagram of the wiring corresponding to Figs. 8 and 9;

Two separately formed troughs or casings are provided, one carrying the line wires, and the other carrying the load wires. One trough covers the other. The controlling devices for the separate load circuits are in one of these troughs, preferably in the covering or outer trough so as to be accessible. The complete structure may be mounted beyond the face of the wall or other support, or may be embedded in the wall to a greater or less extent. The outer trough is made up of a succession of boxes, each containing the controlling devices related to one of the meters.

In the drawings the structure is carried on a support 11 which represents any usual or suitable support. A rear trough is made in sections of any desired length, the back walls 12 of which are fastened on the support 11. There is a closed end wall 13 in one of these sections to which is connected a conduit 14 which carries the three supply lines into the rear trough. The trough may be of any suitable length and its opposite end closed by a plate inserted therein. The top and bottom walls 15 and 16 project forward from the back wall 12 and are provided at their front edges with flanges 17 and 18 which stiffen the edges and provide a support for attachment of the second trough. See Figs. 6 and 7.

The front trough comprises a series of boxes arranged end to end and covering the otherwise open front of the rear trough. Each box has a back wall 19, bottom and top walls 20 and 21 and end walls 22. Each box is closed by a separate cover 23 hinged at one vertical edge, and provided with locked or sealing means at the opposite edge. The back of each box is separately fastened to the flanges 17—18 of the rear box, thus completely enclosing the live wires against access from the outside except by removing the front boxes.

In each of these boxes there are carried the electrical devices, for meter testing or controlling, one of the load circuits. By way of example, I show a base 24 of porcelain or the like carrying a fuse socket 25 which receives a threaded fuse 26. The block also carries the usual terminals for connection to the supply wires, the load wires, and the meter.

Each cover 23 has an opening which in closed position fits closely over the end of the fuse socket 25 so as to prevent access to the terminals while permitting access to the fuse for changing it. Preferably the cover 23 has a depressed portion 27 through which the aforesaid opening is made, the portion 27 bearing against the fuse socket.

A supplementary cover 28 is arranged for the opening. It is set in the depressed portion of the main cover and hinged at its upper end so that it will fall over the socket of the fuse and is generally unlocked so that the customer can change fuses.

For mounting the meter a plate 29 is provided, either separate from or, as shown, forming a part of the corresponding box and constituting an integral vertical extension of the back wall 19 of the box. The free upper end of the plate 29 is supported by brackets 30 fastened to the support 11. The meter 31 has its terminal chamber 32 extending to the top wall 21 of the box (and in some constructions it extends slightly into the box). The terminal chamber is ordinarily closed at the front by a cover 33.

Figures 8, 8A, 9:
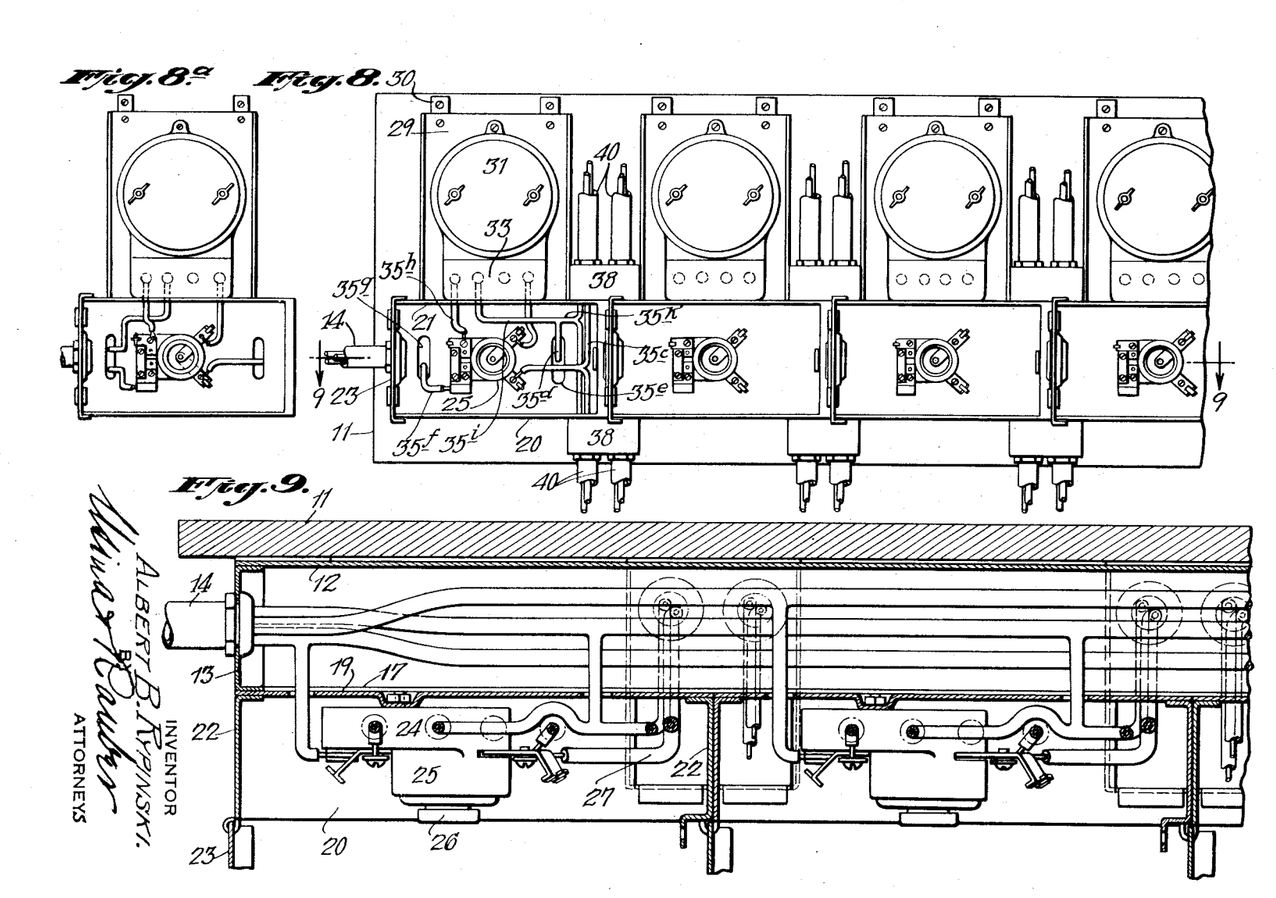
Fig. 8 is a view similar to Fig. 3 showing a modification.
Fig. 8a is a similar view of another wiring.
Fig. 9 is a section on the line 9—9 of Fig. 8.

The supply line wires and the load wires are separated throughout practically their full length by carrying one set of wires in the rear trough and the other in the front trough. Where the load wires are carried in the front trough, the boxes constituting the same have their contiguous ends open to permit the continuous passage of the wires. In Fig. 9, the load wires are in the rear trough and the line wires in the front trough, and in that case the end walls of the boxes constituting the front trough may be closed, the load wires passing from the terminals within each box out through the top and bottom walls thereon. In either case the load wires and the branches from the line wires may be carried in various ways to the proper terminals.

Figure 6:
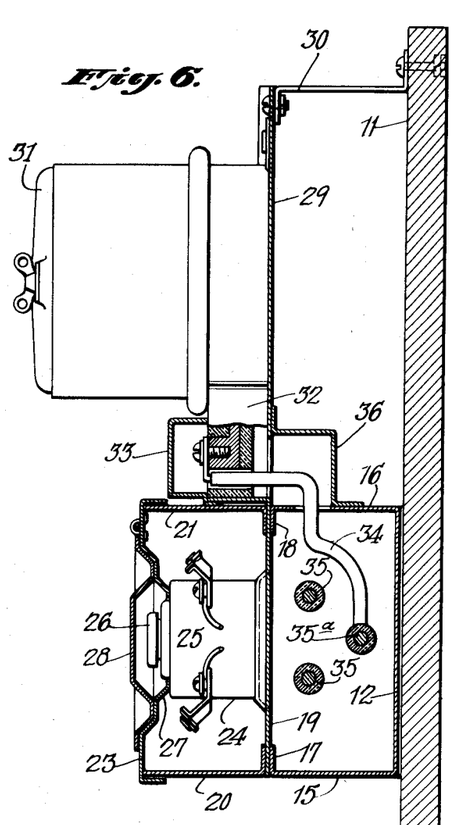
Figs. 6 and 7 are sections on the lines 6—6 and 7—7 of Fig. 2.
Figure 7:
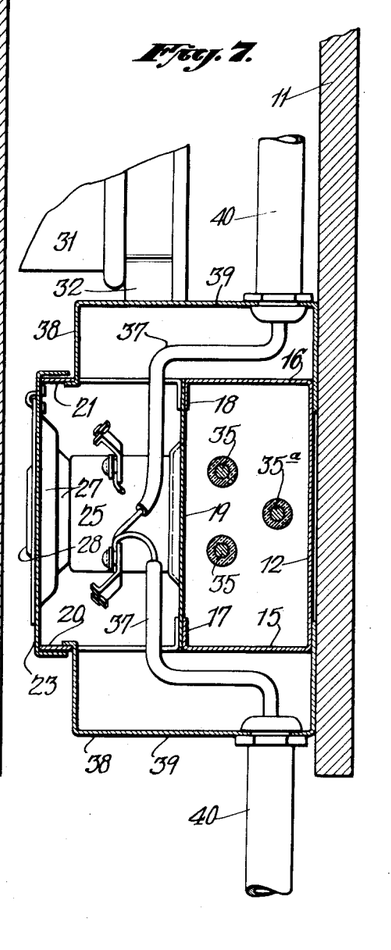

In the arrangement illustrated in Figs. 6 and 7, the connection 34 from the line wires 35 is carried into the back of the meter terminal chamber. A supplementary box or closure 36 covers the openings in the top wall 16 of the trough and in the plate 29 and the back wall of the meter casing and encloses the intermediate portion of the connection. The connection made in this way avoids any chance of contact with the load lines in the box. It also lessens the chance of tampering with the connections in order to steal current from the line. To get access to the line wires, it would be necessary to break the seal of the box cover and also to unscrew the outer trough or box and remove it and the meter supporting plate.

Near the ends of each box there are openings in the top and bottom walls through which to pass load lines from the terminals within the load circuits. Fig. 7 shows such connections 37 extending through the said openings into supplementary boxes or casings 38 mounted on the top and bottom of the box and having openings through their top and bottom walls 39 by which the connecting wires pass to vertical conduits 40.

Figure 1:
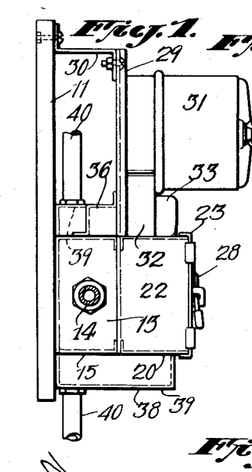
Fig. 1 is an end elevation and Fig. 2 a face elevation of an encased circuit comprising a set of line wires with a number of load circuits branched therefrom.
Figure 2:
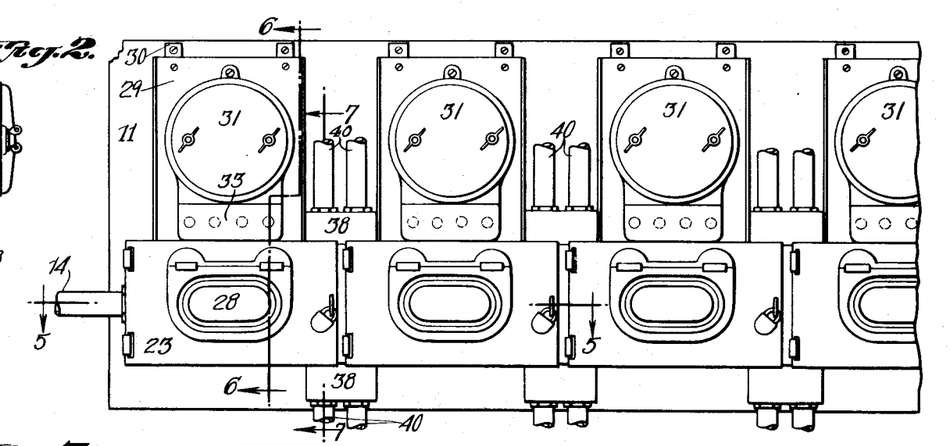
Figure 3:
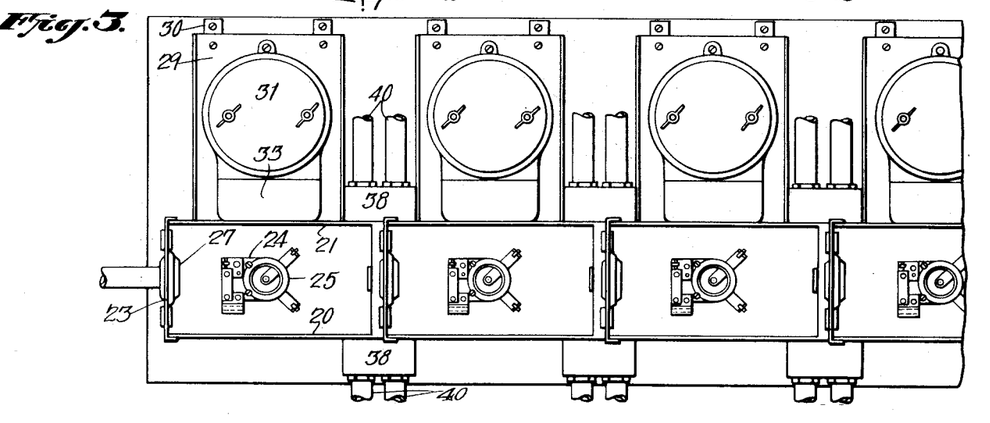
Fig. 3 is a portion of Fig. 2 showing the boxes with the door opened.
Figure 4:
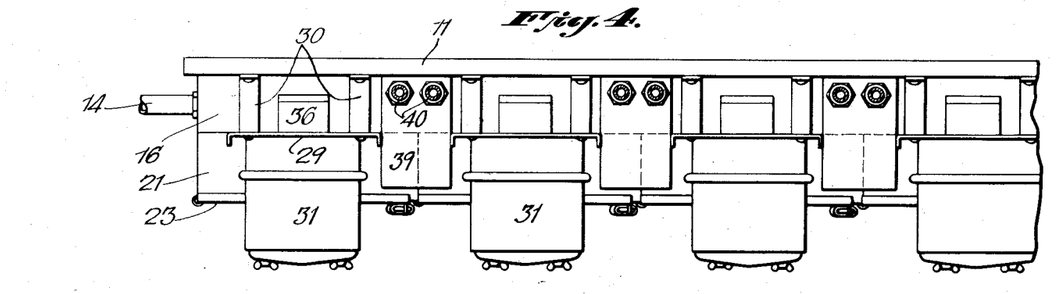
Fig. 4 is a plan of Fig. 2.
Figure 5:
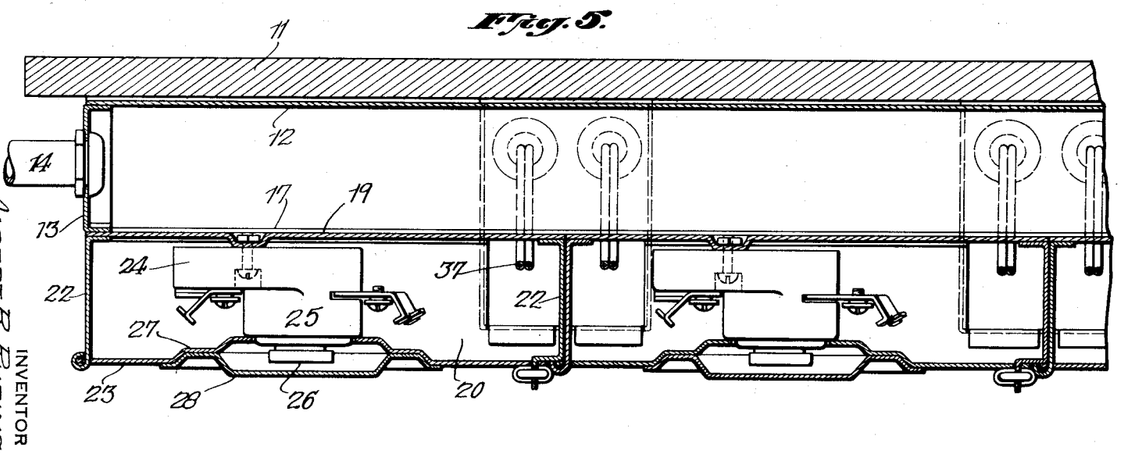
Fig. 5 is a horizontal section on the line 5—5 of Fig. 2.

According to Figs. 2, 6 and 7, and the wiring diagram Fig. 7a, the supply wires, that is the line wires 35 and the neutral 35a, are carried throughout practically their entire length in the rear compartment. The connections to the meter to both of these wires are led out through the top 16 of the casing and through the supplementary protecting casing 36.

It is only the wire 35b, Fig. 7a, from the meter to the cut-out terminal and the wires 35c from the cut-out terminal to the house lines (all of which wires carry metered current), which are exposed upon the opening of the box cover. The wires which carry unmetered current are all in the rear compartment of the casing.

Figs. 8 and 9 represent a simplification of the casing which avoids the necessity of using a supplementary case (like 36, Fig. 6) to cover a portion of the wires leading to the meter.

According to Figs. 8 and 9, and the diagram Fig. 9a, the connection 35d from the neutral 35a passes from the rear compartment through an opening 35e in the back of the box into the front compartment and thence through the top 21 of the outer casing to the meter. The connection 35f from the supply line wire 35 passes through a similar opening 35g in the back of the box to the point of connection with the cut-out terminal on the box 25. And a connection 35h passes from another terminal on the block through the top 25 of the box to the meter terminals.

The connection 35d from the neutral, after entering the box, has two branches. One branch 35i runs through the top of the box to the meter terminal, as above explained. Another branch 35k runs to the conduit 40 which carries it into the house along with a branch 35c from the terminal block, carrying metered current.

Figures 10, 11, 13, 14:
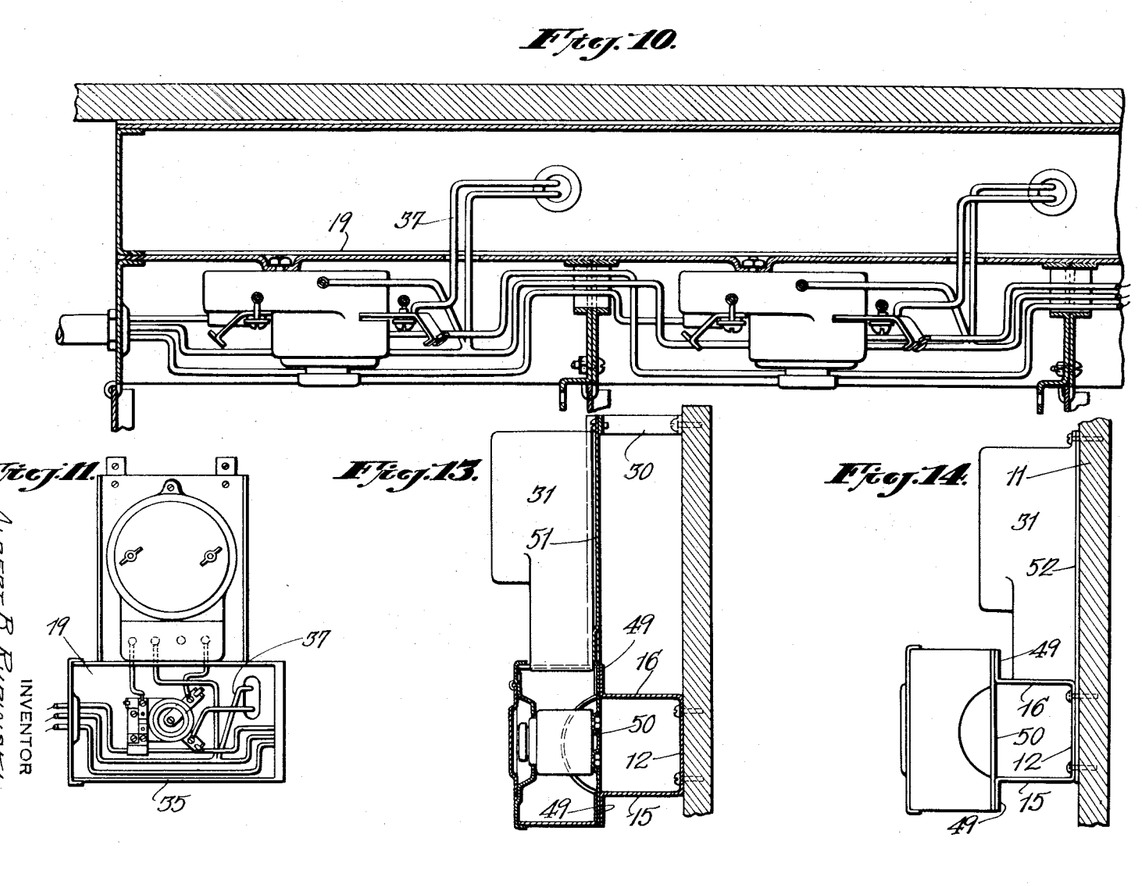
Fig. 10 is a view similar to Fig. 9 showing the supply wires located in the outer trough.
Fig. 11 is an elevation of the wiring of a meter when the supply wires are in the outer trough.
Fig. 13 is a vertical central section showing a modified construction.
Fig. 14 is a similar view showing a different location of the meter.

Fig. 10 shows a suitable arrangement of the supply wires 35 in the outer trough. The load wires 37 run through openings in the back wall 19 into the inner trough and thence to the vertical conduit or conduits 40. The connections for a single meter in such a case are shown in Fig. 11.

Figure 12:
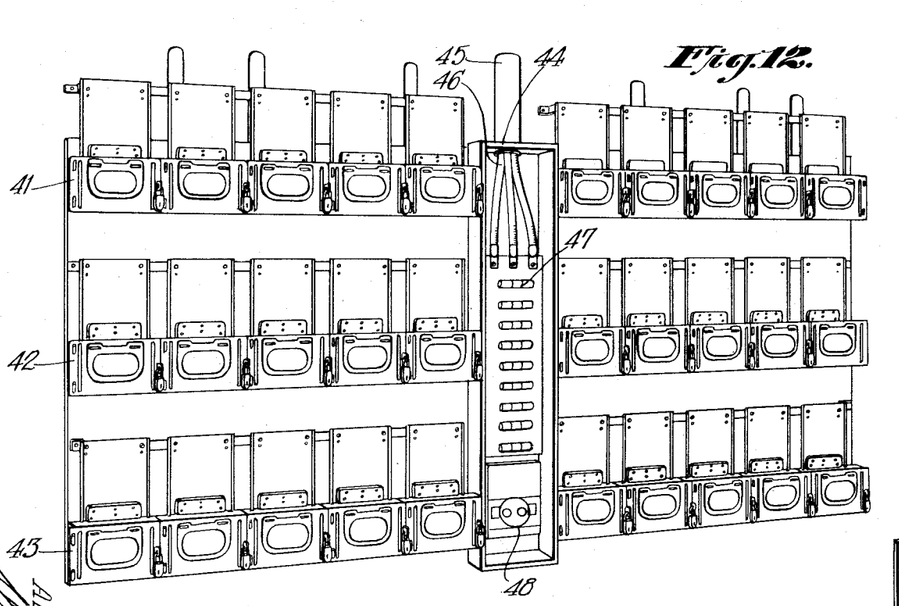
Fig. 12 is a perspective view partly broken away showing an installation of several rows of boxes receiving the supply from a central riser.
Figure 15:
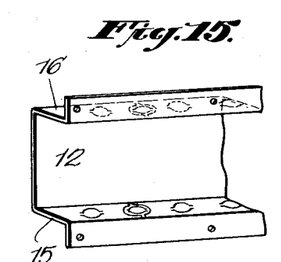
Figs. 15, 16 and 17 are perspective views of the principal parts of an installation of the type shown in Fig. 13.
Figure 16:
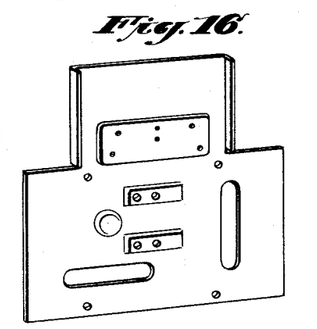
Figure 17:
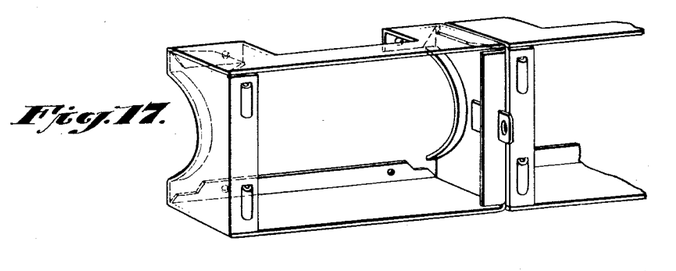

The double trough arrangement may be used in a single line or in several lines either independently or connected by headers at their ends. Fig. 12 illustrates an installation in which there are three tiers 41, 42 and 43. At an intermediate point along the length of each tier is a riser trough 44, to one end of which is connected a conduit 45 through which the supply lines enter. As indicated at 46 they pass out of the riser into the ends of the several tiers of the horizontal troughs. The riser may be a distribution box for the mere passage of the wires to the several troughs. I have illustrated it, however, as enclosing also the supply fuses 47. The first three fuses control the supply for the top row of horizontal troughs, the next three for the middle row and the last three for the bottom row. At the lower end of the trough, I have indicated a main switch 48. In fact, this riser may carry a variety of the usual or suitable devices in such circuits. Where it carries a control device, it is provided with a cover adapted to be locked or sealed.

Instead of forming the back walls 19 as an integral or fixed part of the box, this may be made a separate attachment with certain advantages in manufacture. Figs. 13 to 17 illustrate this. In Fig. 13 the inner trough has its side walls 15 and 16 provided at their forward edges with outer flanges 49. A partition plate 50 is fastened by screws or otherwise on these flanges and forms the backs of the outer trough or box. The inner trough is made of less vertical width than the box in this case, with a saving of metal. The plate 50 is extended upward as at 51 to form a meter board on which the meter 31 is to be mounted.

The walls of the casing have the usual openings (or knockouts for providing such openings) to engage the end of the meter terminal chamber and to pass and enclose the connections from the meter to the cut-out, switch, fuse or the like within the casing. The cut-out or other controlling device is mounted on the meterboard (or extension thereof).

Or as an alternative, the bottom of the back trough may be extended to support the meter or a separate plate 52 (Fig. 14) may be mounted against the main support 11 to carry the meter, the back wall 12 of the inner trough being mounted on the lower part of the plate 52 so that the latter constitutes practically an extension of such back wall.

One of the main advantages of this design is the ease of wiring. In the form illustrated in Figs. 13 to 17 the lower trough is first mounted on the wall, the conduits connected to it, and the load wires run. Next the meterboard and cut-out are installed as a unit and the supply wires connected. This completes the wiring and it is only necessary to slip on the box fronts and covers and seal the lids to complete the installation. The wiring is all done practically wide open, that is with no deep boxes or hard places to work in, which expedites the work and cuts the cost.

Wherever openings are shown in the troughs, boxes or plates, it will be understood that these may be the usual knockouts which are removed to provide openings as desired.

Various modifications may be made by those skilled in the art without departing from the invention as defined in the following claims.

1. A casing for metered electric circuits including supply lines and a series of load circuits branching therefrom, said casing including in combination two separately formed troughs, one carrying the line wires and the other carrying the load wires, a face closure member for one of said troughs, meters and circuit control apparatus for the several load circuits supported thereon, the second trough being positioned upon the face closure member of the other trough so as to enclose the said circuit control apparatus and meter terminals supported thereon.

2. A casing for metered electric circuits comprising supply lines and a series of load circuits branching therefrom, said casing including in combination two separately formed troughs, one carrying the line wires and the other carrying the load wires, a plurality of face closure members for one of the troughs, means to support meters and circuit control apparatus thereon, the second trough being adapted to be positioned upon the face closure member so as to enclose the circuit control apparatus and meter terminals supported thereon, the covering trough being composed of a line of boxes in contiguous succession, each box being adapted to fit upon a face closure member.

3. A casing for metered electric circuits including in combination two troughs, the open face of each being positioned on opposite sides of a face closure member, one carrying line wires and the other load wires, and one trough consisting of a contiguous succession of boxes having their back walls arranged end-to-end, each box having vertical extensions thereon forming meter supports.

4. A casing for metered electric circuits including in combination two troughs, the open face of each being positioned on opposite sides of a face closure member, one carrying line wires and the other load wires, and one trough consisting of a contiguous succession of boxes having their back walls arranged end-to-end, each box having vertical extensions forming meter supports, said extensions being integral with the back walls of the boxes.

5. A casing for metered electric circuits including a supply line and a plurality of metered load circuits branching therefrom, said casing comprising a rear raceway trough for the supply lines, a face closure member for said trough, a meter and circuit control device mounted at spaced intervals thereon, a front raceway trough for the plurality of load circuits, said front trough being adapted to be positioned upon said face closure member so as to enclose all circuit connections between the supply line and the load circuits through the meters and circuit control devices, while leaving the meter face visible.

6. A casing for metered electric circuits including a supply line and a plurality of metered load circuits branching therefrom, said casing comprising a rear raceway trough for the supply lines, a face closure member for said trough, a meter and circuit control device mounted at spaced intervals thereon, a front raceway trough for the plurality of load circuits, said front raceway trough comprising a plurality of open ended boxes contiguously positioned upon the said face closure member so as to enclose all circuit connections between the supply line and the load circuits through the meters and circuit control devices while leaving the meter face visible.

7. A casing for metered electric circuits including a supply line and a plurality of metered load circuits branching therefrom, said casing comprising a rear raceway trough for the supply lines, a plurality of face closure members contiguously positioned upon the open face of said trough to entirely close the same, a meter and circuit control device mounted upon each face closure member, a plurality of open ended boxes contiguously positioned upon the said face closure member to form a second trough for the load circuits, said boxes being mounted to enclose all circuit connections from the supply line to the load circuits through the meters and circuit control devices while leaving the meter face visible.

8. A casing for metered electric circuits including a supply line and a plurality of metered load circuits branching therefrom, said casing comprising a rear raceway trough for the supply lines and a front raceway trough for the load circuits, said front raceway trough comprising a plurality of open ended boxes disposed contiguously upon the open face of said rear raceway trough and totally closing same, the rear wall of each of said boxes carrying circuit control devices for one metered circuit and each of said boxes carrying a vertical extension upon which a meter is mounted with the circuit connections thereto enclosed within said box, the front wall of said box being hinged and removable to permit entrance within the box to connect or disconnect a load circuit to the supply circuit through the meter and circuit control devices of each box.

9. A casing for metered electric circuits including a supply circuit and a plurality of load circuits branching therefrom, said casing including an elongated trough, end closure means therefore and conduit means adapted to carry line circuit terminals into said trough, a face closing element for said trough, a plurality of meter devices and a corresponding plurality of circuit control devices including protecting fuses mounted on said face closing element, a plurality of open ended box-like housings supported on said face closing element in contiguous succession and enclosing said circuit control devices and the terminals of the meter while leaving the meter face visible, means in each of said housings to permit the fuse element enclosed thereby to be removed and exchanged at will without disturbing the assembly, conduit means adapted to carry load circuit terminals into each housing, and electrical connections to carry electric current from the line circuit terminals in the trough through the plurality of meter devices and fuse elements to the plurality of separate load circuit terminals entering said housing.

10. A casing for metered electric circuits including a line supply circuit and a plurality of metered load circuits branching therefrom, said casing comprising a vertically supported elongated trough element, end and face closure members therefor, a plurality of elongated trough elements horizontally supported with the ends thereof opening into the vertically supported trough, end closure means for the opposite ends of the horizontal troughs, a plurality of face closure elements adapted to be positioned contiguously upon the open faces of the horizontally supported troughs to entirely close the same, means on each of said elements to support a meter device, a circuit control device and a protecting fuse element thereon, means to enclose the circuit control devices, fuse elements and each meter terminal in a second trough while leaving the meter face visible, said means comprising a plurality of open ended box-like elements adapted to be contiguously positioned upon the plurality of face closure members with the end sections thereof opening into each other, conduit means to carry a supply circuit into the vertically supported trough, lead wires carrying the load circuit into each horizontally supported trough, conduit means to carry a plurality of load circuits away from the second trough and a plurality of circuit connections to carry the current from the supply circuit in the horizontally supported troughs through a meter, a circuit control device and a fuse element and thence to a load circuit.

11. A casting for metered electric circuits including a supply line and a plurality of metered load circuits branching therefrom, said casing comprising a rear raceway trough for the supply lines, a plurality of face closure members contiguously positioned upon the open face of said trough, a meter and circuit control device mounted upon each face closure member, a plurality of open ended boxes contiguously positioned upon the said face closure member to form a second trough for the load circuits, said boxes being mounted to enclose all circuit connections from the supply line to the load circuits through the meters and circuit control devices while leaving the meter face visible.

12. A casing for the purpose described embracing supply and load wires, circuit control and metering devices, conduit entrances and wire connections between the various parts, a vertically supported trough element, end and face closure members therefor, several horizontally supported trough elements with the ends thereof opening into the vertical trough, closure means for the remaining ends of the horizontal troughs, several face closure elements mounted contiguously upon the open faces of the horizontal troughs, means on each of said elements to support a meter and a circuit control device, a second set of horizontal troughs adapted to enclose the wiring, the circuit control devices and the meter terminals but not the meter faces, the second troughs consisting of several contiguous open ended boxes mounted on the face closure members with the end sections thereof opening into each other.

13. A casing for the purpose described including a trough adapted for mounting on a wall, conduit means for load circuit wires in said trough, several face closure members for said trough carrying circuit control and metering devices, openings in the face closure members for wires connected with said control devices, means for installing supply wires after the face closure members are in place, connecting means on the control devices for supply wires, and several boxes in contiguous succession forming a trough over the wires and control devices, said boxes capable of installation and removal without disturbing the wiring or control devices.

ALBERT B. RYPINSKI.